United States Patent Office 3,288,259
Patented Nov. 29, 1966

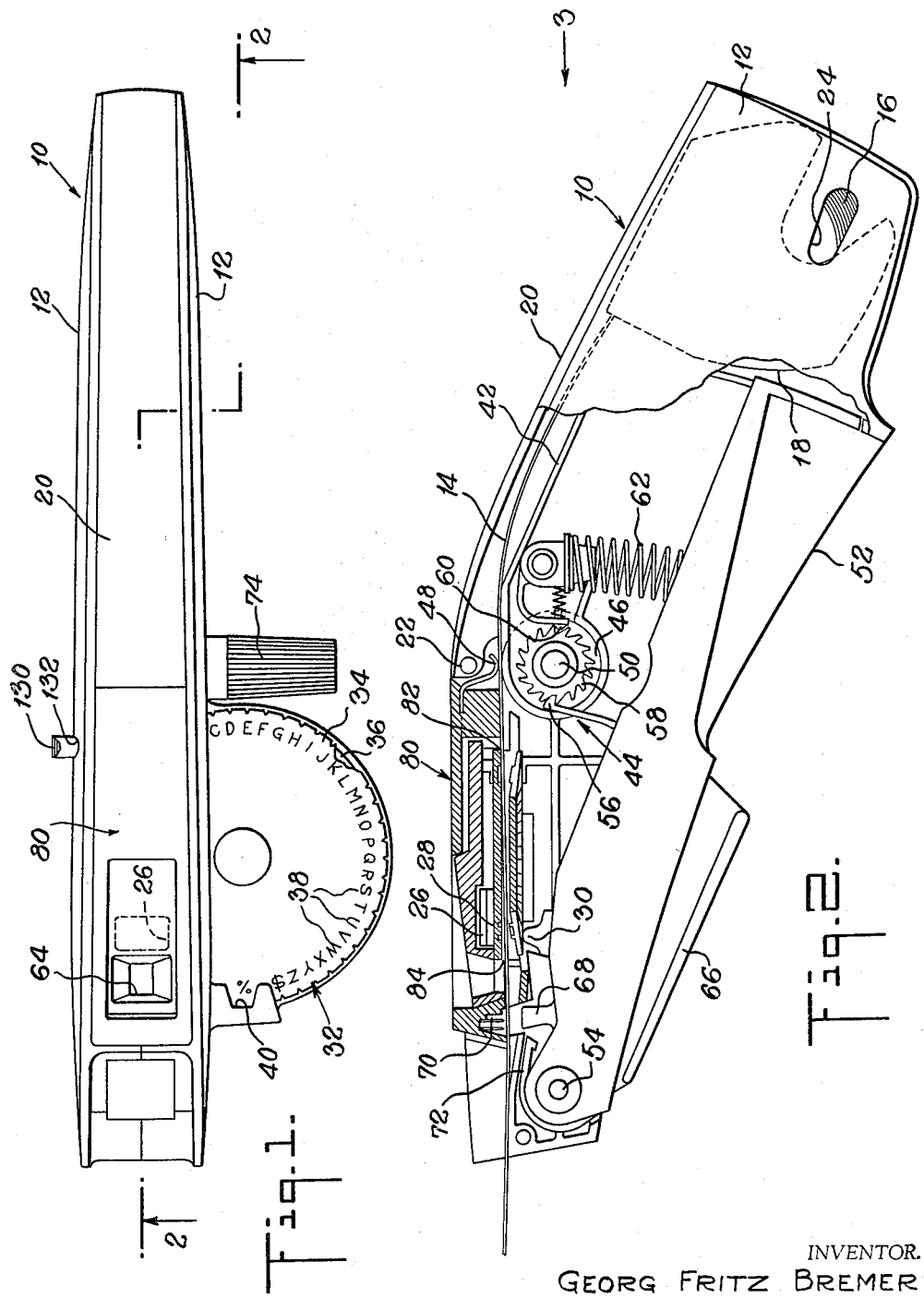

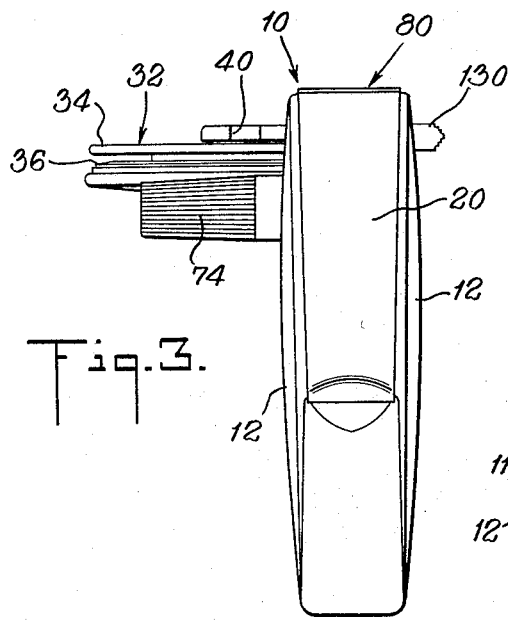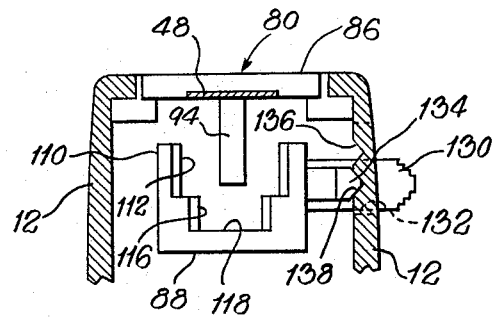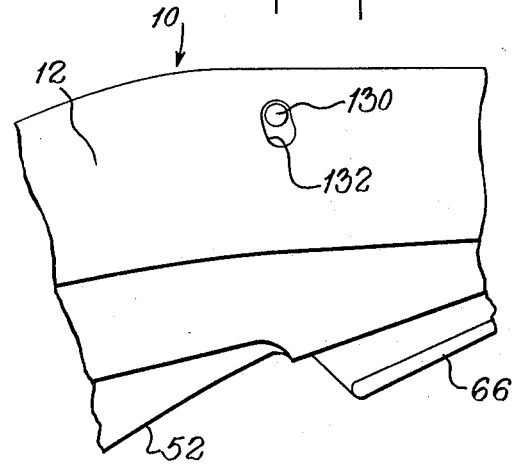

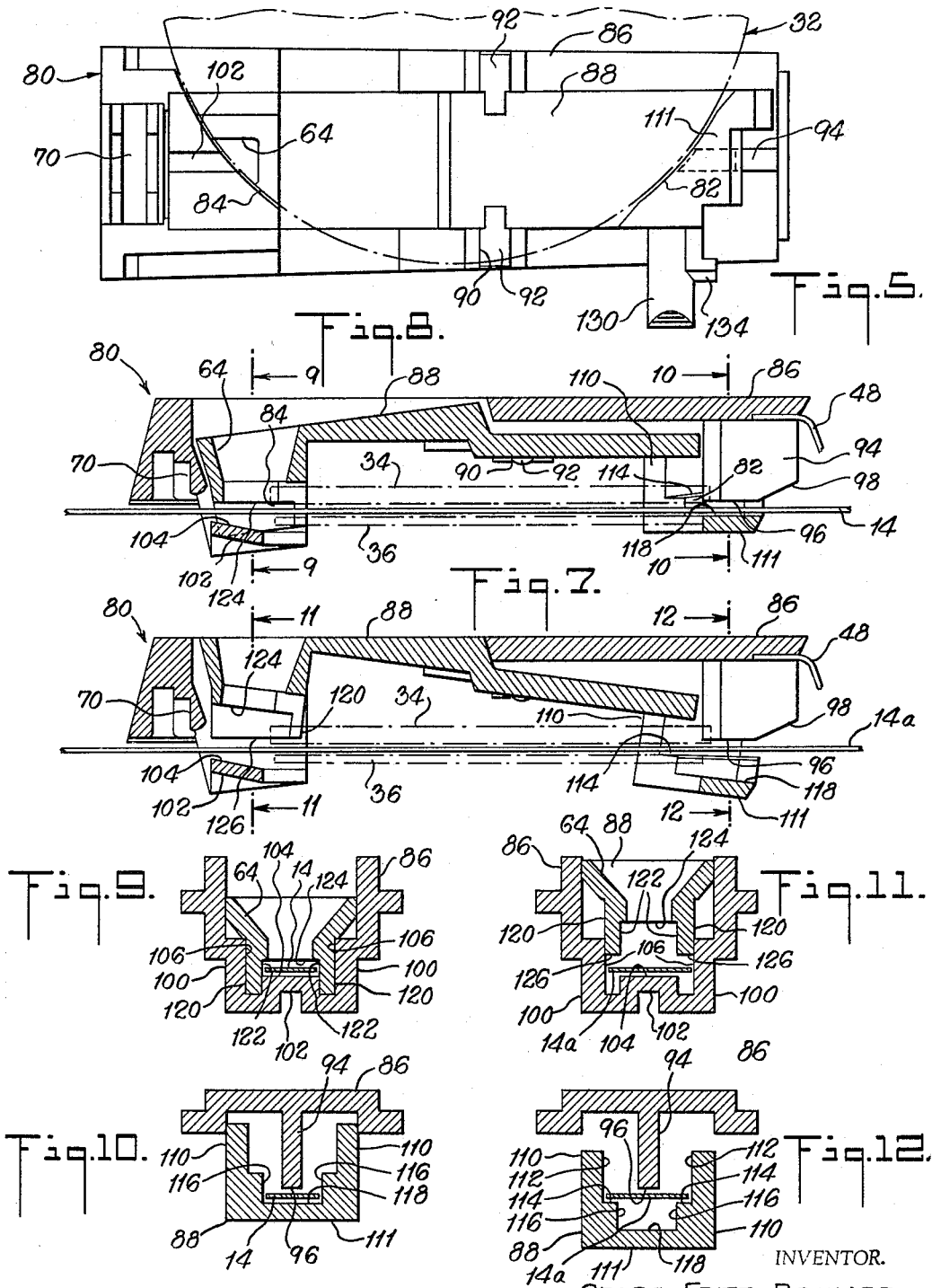

3,288,259
EMBOSSING TOOL FOR SELECTIVELY ACCOMMODATING MATERIAL OF DIFFERENT SIZES
Georg Fritz Bremer, Albany, Calif., assignor to Dymo Industries, Inc., Emeryville, Calif., a corporation of California
Filed Mar. 1, 1965, Ser. No. 435,962
6 Claims. (Cl. 197—6.7)

The invention relates generally to embossing tools and pertains, more specifically, to embossing tools incorporating means for selectively accommodating embossable material in strips of different widths.

A variety of embossing tools are presently available for establishing embossments in strips of embossable material in the fabrication of labels, signs, plates, tags, and the like. More recently, such tools have been developed for embossing various indicia on thin plastic strips formed of sheeted thermoplastic resins which are capable of being cold-formed to establish a contrast color relief enfigurement therein. Usually, the tools employ embossing means for establishing the desired embossments, a supply of strip material and means for feeding the strip material from the supply to the embossing means. Often, the strip material is supplied from a magazine placed in the body of the tool. The strip material is usually in the form of an elongated flexible tape having a constant, closely controlled width.

In embossing indicia on the tape, it is desirable to register the tape accurately with the embossing means, especially in a lateral direction, so that the indicia will be embossed along a uniform, well spaced line on the tape. Such a result may be achieved by the employment of a tape guide or track which positively locates the longitudinal edges of the tape to align the tape with the embossing means and maintain the tape in such alignment during embossing operations.

Because the above described tools are generally designed to accept magazine tape supplies, it is relatively easy to insert any one of a series of interchangeable tapes of various widths within a tool; however, because the tape guide must have a different, well defined width for each size tape, a problem has been encountered in providing a tape guide means for accommodating tapes of various widths.

It is therefore an object of the invention to provide an embossing tool which can effectively accommodate embossable material of different widths without the requirement for major changes or adjustments in the tool.

Another object of the invention is to provide means in an embossing tool for guiding and locating embossable strip material as the material is adavnced through the tool and wherein a relatively simple adjustment will allow selective accommodation of strip material of different widths.

A further object of the invention is to provide an embossing tool for embossing indicia upon an elongated tape and having a tape guide capable of being readily adapted for positively locating and guiding tapes of more than one width within the tool.

A still further object of the invention is to provide an embossing tool capable of embossing indicia upon interchangeable tape material of different widths and capable of accommodating tape material of different widths without requiring interchangeable component parts and without a significant increase in size or complexity.

Still another object of the invention is to provide a tool as described above having a simplified design, ease of operation and being capabale of providing improved performance without a concomitant increase in complexity.

The invention may be described briefly as an improvement in an embossing tool which is capable of establishing an embossment in elongated strip material of different widths and having embossing means therein for establishing the embossment, the improvement comprising a strip guide for selectively guiding a strip of one width along a fixed longitudinal path to and from the embossing means and positively aligning the strip with the embossing means between an entrance and exit thereof, the strip guide including means providing a guide channel at the entrance and one at the exit of the embossing means for laterally aligning the strip along the prescribed fixed path, the guide channels including laterally spaced locating surfaces defining channels of lesser and greater widths, means movable relative to the fixed path in a direction transverse to the lateral and longitudinal directions between a first position for confining a strip of lesser width to a complementary guide channel of lesser width and a second position for allowing a strip of greater width to enter a complementary guide channel of greater width while confining either of the strips transversely as well as laterally to the same prescribed path regardless of the width of the strip.

The invention will be more fully understood and further objects and advantages thereof will become apparent in the following detailed description of an embodiment of the invention illustrated in the accompanying drawings, in which:

FIGURE 1 is a plan view of a hand operated embossing tool constructed in accordance with the invention;

FIGURE 2 is a side elevational cross-sectional view taken along line 2—2 of FIGURE 1;

FIGURE 3 is an end elevational view looking in the direction of the arrow in FIGURE 2;

FIGURE 4 is a fragmentary side elevational view showing a detail of the side opposite to that shown in FIGURE 2;

FIGURE 5 is an enlarged bottom plan view of a tape strip guide employed in the tool;

FIGURE 6 is an end elevational view of the tape strip guide illustrated within the tool;

FIGURES 7 and 8 are longitudinal cross-sectional views of the tape strip guide illustrating two modes of operation; and FIGURES 9, 10, 11 and 12 are transverse cross-sectional views taken along lines 9—9, 10—10, 11—11 and 12—12, respectively, in FIGURES 7 and 8.

Referring to the drawings, a hand operated embossing tool is indicated generally at 10 in FIGURES 1 through 3. Tool 10 has a housing 12 which has a general configuration adapted to make the tool easily operated while being held in one hand. The tool is designed to emboss selected indicia in an elongated strip of embossable material such as the variety of thermoplastic resins currently available in the form of plastic tapes of various widths. As seen in FIGURE 2, an embossable tape 14 is supplied in the form of a roll 16 in a tape magazine 18 received within the housing 12 through a door 20 in the housing hinged thereto at 22. An aperture 24 provides a convenient means for visually determining the amount of tape remaining in the supply as the tool is operated.

Embossing of the tape 14 is accomplished at an embossing station 26 wherein there is located embossing means shown in the form of an embossing die set 28 actuated by a reciprocating actuating member 30. Die set 28 is one of a series of die sets located in the periphery of selector wheel 32 which is rotatably mounted in housing 12 so that any one of the series of die sets can be located at the embossing station 26 to emboss selected indicia in the tape 14. Selector wheel 32 is made up of upper and lower disks 34 and 36, respectively, one of which carries the die and the other of which carries the punch of each die set. As seen in FIGURE 1, the upper disk 34 is provided with visible characters 38 on the outer face thereof corresponding to the indicia which can be embossed by the selectable die sets. The visible characters are also located along the periphery of the selector wheel, but are circumferentially displaced from their corresponding die sets so that when a particular die set is located at the embossing station 26, the corresponding visible character is located at a selector slot 40 provided in the housing 12.

Tape 14 is fed from supply roll 16 through a duct 42 toward the embossing station 26 by feed means 44 which comprises feed roll 46 which frictionally grips the tape where a leaf spring 48 presses the tape against the surface of the roll and advances the tape in prescribed increments by being rotated in a counterclockwise direction about shaft 50 upon which roll 46 is journaled in the housing as will be explained hereinafter.

Embossing of tape 14 is accomplished by displacing actuating handle 52, which is pivotally mounted to housing 12 at 54, in a counterclockwise direction to bring actuating member 30 vertically upwardly into contact with a portion of lower disk 36 and continuing such rotation until member 30 actuates the die set 28 positioned at the embossing station 26 and an embossment is established in the tape. At the same time, pawl 56 is moved vertically upwardly to engage the next successive tooth of ratchet 58 which is operatively interengaged with feed roll 46 such that rotation of the ratchet wheel will rotate the feed roll. Rotation of ratchet wheel 58 is precluded during the upward movement of pawl 56 by virtue of spring actuated detent means 60 which resiliently engages further teeth of the ratchet wheel. During the counterclockwise displacement of actuating handle 52, helical spring 62 is compressed so that upon completion of the embossing operation and release of actuating handle 52, the handle 52 is urged back to its starting position by spring 62 with a force sufficient to assure that pawl 56 will rotate ratchet wheel 58 in a counterclockwise direction against the deterrent of detent 60 to rotate feed roll 46 and advance tape 14 through the increment necessary to index the tape for a subsequent embossment. Detent 60 further serves to accurately define the desired increment of rotation so that the tape is automatically indexed a length sufficient to accurately locate each successive embossment on the tape. A window 64 is provided in order to enable the embossed indicia to be viewed immediately after the completion of the embossing operation and the advancement of the tape.

Upon completion of the particular embossed article, the article may be severed from the tape by the displacement of a second actuating bar 66, which is also mounted for pivotal movement at 54, in a counterclockwise direction. Such displacement will move a cut-off punch 68 vertically upwardly into a cut-off die 70 to sever the tape. A leaf spring 72 will return actuating bar 66 and cut-off punch 68 back to their normal starting positions shown in FIGURE 2. A tape advance knob 74 is operatively connected to shaft 50 for manually advancing tape 14 by rotation thereof whenever it is desired to advance tape 14 without actuating the handle 52.

It will be apparent from the above described construction that the quality and uniformity of the embossed indicia are directly affected by the registry of the tape at the embossing station. This is particularly true of lateral registration across the width of the tape. Thus, it becomes necessary to assure that the tape is aligned accurately with a single prescribed longitudinal path through the embossing station. Such a result is easily accomplished by providing tape guide means adjacent the entrance and adjacent the exit to the embossing means, the guide means having edges and surfaces fixed for guiding and maintaining the tape aligned along the prescribed fixed path. However, where a tool of the type described is to be made capable of accepting tapes of different widths, such fixed guides are not acceptable and some means must be provided for making available a specific guide means for each width tape to be accommodated.

While interchangeable guide members are a possible solution, the requirement for the removal and insertion of various component parts to convert the tool for handling first a tape of one width and then a tape of another width is undesirable in that such steps are time consuming, annoying and can lead to lost component parts.

It has been found that a tape guide can be constructed which is readily converted for accommodating tapes of different widths without requiring the substitution of any component parts to accomplish the conversion.

Tool 10 employs a tape guide 80 (see FIGURE 2) which is mounted in housing 12 and extends longitudinally along the path of tape 14 to straddle the selector wheel 32 and provide a tape guide channel at the entrance 82 where the tape passes between the upper and lower disks 34 and 36 of the embossing means and at the exit 84 where the tape leaves the embossing means.

Turning now to FIGURES 5 through 12, tape guide 80 is comprised of a first member 86 and a second member 88 pivotally mounted thereto by means of sockets 90 in the first member which receive axles 92 fixed to the second member so that second member 88 is journaled for rotation with respect to first member 86 between first and second positions to selectively accommodate a tape of one width at one position and a tape of a different width at the other position in a manner which will now be explained.

The first member is fixed in housing 12 and includes a depending projection 94 adjacent entrance 82, the projection providing a horizontal surface 96 which defines the vertically uppermost limit of the desired path of travel of tape 14. The projection 94 is beveled at 98 to provide a lead-in surface for the tape as it enters the guide 80. Adjacent the exit 84, first member 86 is provided with laterally spaced depending vertical walls 100 and a horizontal member 102 interconnecting the walls 100 to provide a generally horizontal surface 104 which defines the vertically lowermost limit of the tape path. The internal surfaces 106 of walls 100 and horizontal surface 104 constitute a first guide channel.

The second member 88 has depending laterally spaced vertical walls 110 located adjacent one end thereof with one wall at each side of projection 94, the walls 110 being interconnected by horizontal member 111 and having inner vertical surfaces 112 and horizontal surfaces 114 establishing a second guide channel and inner vertical surfaces 116 and a horizontal surface 118 establishing a third guide channel vertically below the second guide channel. Adjacent the other end of the second member are depending laterally spaced vertical elements 120 having inner vertical surfaces 122 and a horizontal surface 124 defining a fourth guide channel. The depending elements 120 also provide horizontal surfaces 126 which function in a manner described below.

When the second member 88 is in the first position shown in FIGURE 7, the first guide channel (FIGURE 11) has a first throat defined by surfaces 104, 106 and 124, the first throat being of a width complementary to a relatively wide tape 14a. The second guide channel (FIGURE 12) then has a second throat defined by surfaces 96, 112 and 114, the second throat also being of a width complementary to the relatively wide tape 14a. The tape 14a is confined by both vertical and horizontal surfaces in each of the first and second throats so that the throats function as accurate guides for maintaining the tape aligned with the prescribed fixed path.

Upon rotation of second member 88 to the second position illustrated in FIGURE 8 the second and third guide channels are moved vertically upwardly (FIGURE 10) such that projection 94 closes the second throat and establishes a third throat defined by surfaces 96, 116 and 118, the third throat being of a width complementary to the width of a relatively narrow tape 14. At the same time, depending elements 120 and the fourth guide channel defined thereby are moved vertical downwardly (FIGURE 9) to close the first throat and establish a fourth throat defined by surfaces 104, 122 and 124, the fourth throat also having a width complementary to the width of tape 14. The third and fourth throats serve as positive guides for aligning the narrower tape 14 with the prescribed path and confine the tape along the path with surfaces surrounding the tape on four sides. It is noted that the tape path always remains constant and does not shift position despite rotation of second member 88. The path is defined by the fixed horizontal surfaces 96 and 104. In this connection, it is noted that bevel surface 98 aids in leading the tape into the second and third guide channels while the longitudinal slant imparted to surface 104 aids in leading the tape into the first and fourth guide channels. Thus, it may be seen that one simple movement of a single component part readily converts tool 10 to accommodate tapes of either one of two widths.

The illustrated movement of second member 88 is accomplished by merely moving arm 130, which is appended to member 88, upwardly or downwardly. As best seen in FIGURES 4 and 6, arm 130 projects through a slot 132 in housing 12. Detent means are provided in the form of tooth 134 integral with arm 130 and grooves 136 and 138 in housing 12 for maintaining second member 88 fixed in either of the two positions illustrated.

It is understood that the foregoing detailed description of an embodiment of the invention is provided by way of example only. Modifications in various details of design and construction may be accomplished without departing from the true spirit and scope of the invention as defined in the appended claims.

What is claimed is:

1. In an embossing tool capable of establishing an embossment in elongated strip material of different widths and having embossing means therein for establishing the embossment, a strip guide for selectively guiding a strip of one width along a fixed prescribed longitudinal path to and from the embossing means and positively aligning the center line of the strip with the embossing means between an entrance and exit thereof, said strip guide comprising:

means providing a first guide channel at the entrance and a second guide channel at the exit of the embossing means for laterally aligning the strip along the prescribed path, said guide channels each including laterally spaced locating surfaces defining guide channels of lesser and greater widths; and means movable relative to said fixed prescribed path in a direction transverse to said lateral and longitudinal directions between a first position and a second position, movement of said means simultaneously adjusting spaced locating surfaces at each of said first and second guide channels to thereby adjust said guide channels from one of said widths to the other of said widths to accommodate different widths of tape, said guide channels, said locating surfaces and said movable means being arranged so that the centerline of the strip to be embossed is maintained transversely as well as laterally to the same fixed prescribed path regardless of the width of the strip.

2. In an embossing tool capable of establishing an embossment in elongated strip material of either of two widths and having embossing means therein for establishing the embossment, a strip guide for selectively guiding a strip of one width along a fixed horizontal path to and from the embossing means and positively aligning the strip both horizontally and vertically with the embossing means between an entrance and exit thereof, said strip guide comprising:

a first member providing a first horizontal surface fixed at the entrance to said embossing means and a first guide channel of a width complementary to the first of said two strip widths fixed at the exit from said embossing means and including a second horizontal surface, both said horizontal surfaces vertically defining said fixed path; and a second member cooperatively engaged with said first member and having second and third vertically displaced guide channels of different widths complementary to said two strip widths adjacent said first horizontal surface and laterally spaced vertical elements defining a fourth guide channel adjacent said second horizontal surface;

said second member being movable relative to said first member between a first position wherein a strip of first width may be received in said first and second guide channels and aligned along said fixed path laterally by the width of said first and second guide channels and vertically by said horizontal surfaces and a second position wherein the third guide channel is moved toward said first horizontal surface and said fourth guide channel is moved toward said second horizontal surface to enable the reception of a strip of second width in said third and fourth guide channels and the alignment of said strip of second width along the fixed path laterally by the width of said third and fourth channels and vertically by said horizontal surfaces.

3. The improvement defined in claim 2 wherein said second member is pivotally mounted in said first member between the first and second horizontal surfaces such that the second member is moved between said first and second positions by rotation thereof relative to the first member.

4. In an embossing tool capable of establishing an embossment in elongated strip material of either of two widths and having a housing with embossing means therein for establishing the embossment, a strip guide for selectively guiding a strip of one width along a fixed horizontal path to and from the embossing means and positively aligning the strip both horizontally and vertically with the embossing means between an entrance and exit thereof, said strip guide comprising:

a first member fixed in said housing and straddling the embossing means along said fixed path;

a projection depending from said first member adjacent the entrance to the embossing means and providing a first horizontal surface vertically defining said fixed path at said entrance;

a first guide channel depending from said fixed member adjacent the exit from the embossing means and including laterally spaced vertical walls defining a first throat complementary to the width of the first of said two strips and a horizontal member interconnecting said walls and providing a second horizontal surface vertically defining said fixed path at said exit;

a second member mounted for movement relative to said first member;

a second guide channel depending from the second member adjacent said projection and including laterally spaced vertical walls defining a second throat complementary to the width of the first of said two strips;

a third guide channel depending from the second member adjacent said projection vertically below said second channel and including laterally spaced vertical walls defining a third throat complementary to the width of the second of said two strips; and laterally spaced vertical elements depending from said second member adjacent the exit from the embossing means defining a fourth guide channel having a fourth throat complementary to the width of the second of said two strips;

said second member being movable relative to said first member between a first position wherein a strip of said first width may be received in the first and second guide channels and aligned along said fixed path laterally by said first and second throats and vertically by said first and second horizontal surfaces and a second position wherein a strip of said second width may be aligned along said fixed path by said third and fourth throats by virtue of a vertical upward displacement of the second and third guide channels toward said projection such that the projection closes the second throat and the third guide channel is placed such that the horizontal surface is in position to vertically align said strip of second width in the third guide channel, and vertical downward displacement of said vertical elements closes said first throat and places said fourth guide channel in position to laterally align said strip of second width, which strip is vertically aligned by the second horizontal surface.

5. The improvement defined in claim 4 wherein the second member is pivotally mounted in the first member between the first and second horizontal surfaces such that the second member is moved between said first and second positions by rotation thereof relative to the first member.

6. The improvement defined in claim 5 wherein the second member and the housing are provided with cooperating detent means for maintaining the second member in either one of said two positions.

References Cited by the Examiner
UNITED STATES PATENTS

| | | | |
|---|---|---|---|
| 2,377,978 | 6/1945 | Steeneck | 226—199 X |
| 2,797,090 | 6/1957 | Tholstrup | 226—199 |
| 2,950,072 | 8/1960 | Hayashida et al. | 226—199 |
| 3,006,521 | 10/1961 | Wapling et al. | 226—199 X |
| 3,131,843 | 5/1964 | Bentley | 226—199 X |
| 3,155,215 | 11/1964 | Avery | 197—6.7 |
| 3,204,845 | 9/1965 | Griffith | 226—199 |

ROBERT E. PULFREY, *Primary Examiner.*

E. S. BURR, *Assistant Examiner.*